(No Model.)
S. J. SHAW.
FURNITURE BEATER.
No. 477,388. Patented June 21, 1892.
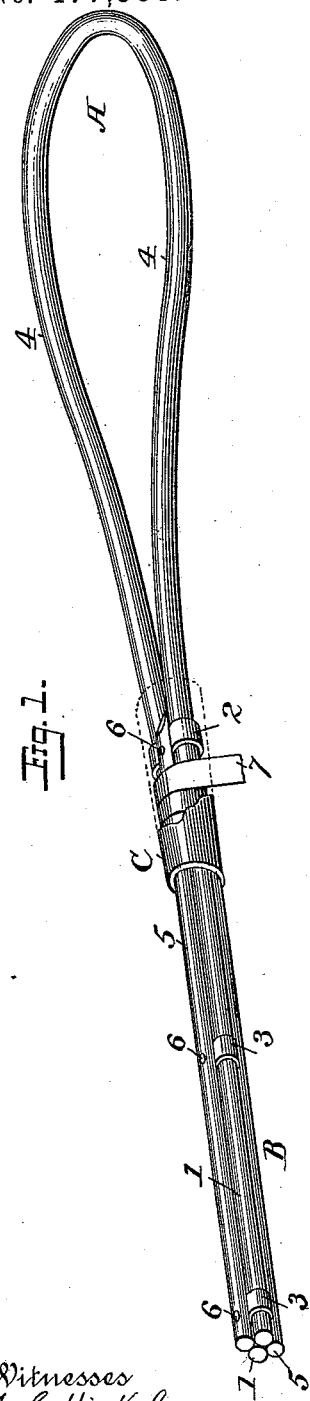
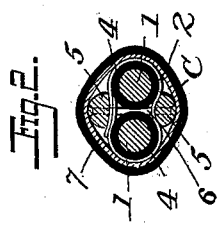
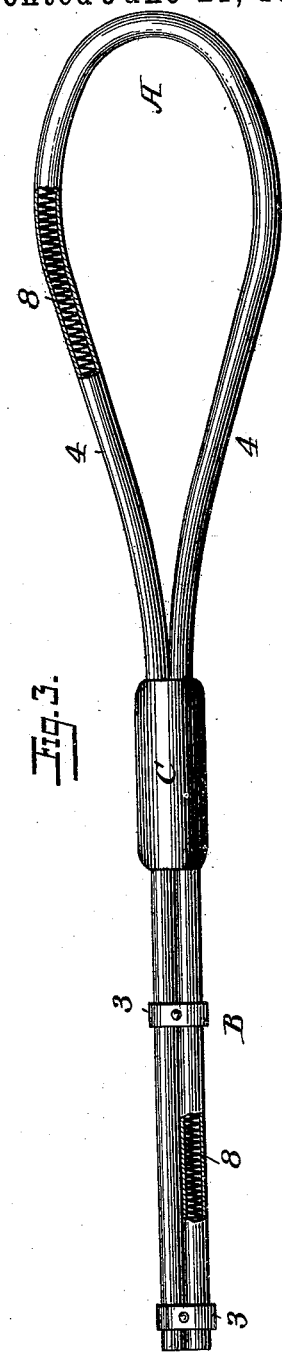
Witnesses
Jno. G. Hinkel
J. J. McCarthy
Inventor
Samuel J. Shaw
by Foster Freeman
Attorneys

UNITED STATES PATENT OFFICE.

SAMUEL J. SHAW, OF BOSTON, MASSACHUSETTS, ASSIGNOR OF TWO-THIRDS TO EUGENE H. SMITH AND MARSHALL E. HUNTER, OF SAME PLACE.

FURNITURE-BEATER.

SPECIFICATION forming part of Letters Patent No. 477,388, dated June 21, 1892.

Application filed January 16, 1892. Serial No. 418,267. (No model.)

*To all whom it may concern:*

Be it known that I, SAMUEL J. SHAW, a citizen of the United States, residing at Boston, in the county of Suffolk and State of Massachusetts, have invented certain new and useful Improvements in Furniture-Beaters, of which the following is a specification.

In that class of furniture-beaters having flexible heads consisting of rods or strips connected with the handle it is common to provide the strips or rods with coverings of rubber or other like material and to connect the strips to the handles in different ways by connecting means exposed at the outside of the material. As the result of constructions heretofore adopted, the coverings of the strips or rods are liable to be displaced in consequence of their insecure fastenings, while the fastening means at the point of junction of the strips and handles sometimes abrade the furniture-coverings. In order to overcome these objections I construct the beaters as fully set forth hereinafter, and as illustrated in the accompanying drawings, in which—

Figure 1 is an external view illustrating one form in which my improved furniture-beater may be made. Fig. 2 is a sectional view of the construction shown in Fig. 1. Fig. 3 is a part sectional view illustrating another form of beater with my improvement.

The head A of the beater consists of flexible strips covered with rubber or equivalent substance of any suitable number and arrangement, the ends of which serve to form a portion of the handle B. In the construction shown in Figs. 1 and 2, a flexible strip 1, of rattan or cane or other suitable material is bent in the form of a loop, the ends of the strip extending back parallel to each other the entire length of the handle and constituting a part thereof. The loop forming the head A is covered with a layer of rubber 4 or other suitable protecting coating, which extends to the junction of the head with the handle. Close to this junction at the crotched portion the covered strips are surrounded by a band or collar 2, which serves to hold the ends of the covering 4 in position and prevent the same from working toward the outer end of the beater and rolling up in folds. About the center and also at or near the outer end of the handle, similar collars or bands 3 are also placed. These collars, together with collar 2, are firmly fastened or secured by additional parallel strips 5, which may be cane or similar material, and are joined to the handle by means of rivets 6 or their equivalents. The rivets pass entirely through the strips 5 and the collars 2 3, and by drawing inward the strips the clamps or bands are bent in between the extended ends of the looped portion 1, making firm connection therewith and thereby producing a most suitable handle for manipulating the beater. I then tightly bind about the collar 2 and about the ends of the rubber covering and a portion of the handle a suitable tape 7, preferably cementing the same thereto. This tape, in addition to making a neat covering for the otherwise exposed portions of the fastening means at the junction of the head with the handle, will also tend to act as a soft pad in the operation of the beater. Surrounding the whole is placed a ferrule C, of rubber, which serves to hold the ends of the covering 4 in position and to cover the clamp or binding-wire, so that the furniture cannot be injured by the contact of such fastening means with either the wood-work or fabric of the furniture when the beater is used. The ferrule C is also preferably cemented to the other parts, so that when completed the covering 4, tape 7, and sleeve C, will be practically in one piece and will be so secured to the flexible head and handle as to be practically immovable. In such case each part will be firmly connected to the other, aiding in retaining each other in place, and even if a portion of the covering should be worn, so as to expose the rod, there will be no tendency for the covering to slip back and away from the exposed portion of the rod. If desired, the coatings, sleeves, and ferrule may be of rubber composition applied soft and afterwards vulcanized in place, forming one continuous piece.

In the construction shown in Fig. 3 the head consists of a single loop formed of coiled wire 8 surrounded by the covering 4, the ends constituting a portion of the handle.

Without limiting myself to the precise construction and arrangement of parts shown, I claim—

1. A furniture-beater consisting of a strip of flexible material bent in the form of a loop and having its ends brought together in the handle, a flexible covering-tube upon the loop portion or head, a band or clamp at the crotch of the loop for retaining the ends of the covering-tube, and a protecting wrapping surrounding said clamp, substantially as described.

2. A furniture-beater consisting of a strip of flexible material bent in the form of a loop and having its ends brought together and secured by clamps to form a handle, a flexible covering-tube upon the loop portion or head, and the additional strips parallel to and between the ends of the loop-strips and bearing on the clamps, substantially as described.

3. The combination of the head and handle portion, the head covered with soft material, a binding material 7, and an overlapping ferrule, substantially as described.

In testimony whereof I have signed my name to this specification in the presence of two subscribing witnesses.

SAMUEL J. SHAW.

Witnesses:
WILLIAM CUSHING WAIT,
EDMUND A. WHITMAN.